(12) United States Patent
West (10) Patent No.: US 11,708,169 B2
(45) Date of Patent: Jul. 25, 2023

(54) THRUST LOAD REACTION ASSEMBLY

(71) Applicant: SPIRIT AEROSYSTEMS, INC., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 353 days.

(21) Appl. No.: 17/120,404

(22) Filed: Dec. 14, 2020

(65) Prior Publication Data

US 2022/0185491 A1  Jun. 16, 2022

(51) Int. Cl.
*B64D 27/26* (2006.01)

(52) U.S. Cl.
CPC ........ *B64D 27/26* (2013.01); *B64D 2027/264* (2013.01); *B64D 2027/268* (2013.01)

(58) Field of Classification Search
CPC .............. B64D 27/26; B64D 2027/264; B64D 2027/268
See application file for complete search history.

(56) References Cited

U.S. PATENT DOCUMENTS

| 5,873,547 | A | 2/1999 | Dunstan |
| 8,087,608 | B2 | 1/2012 | Combes et al. |
| 8,322,651 | B2* | 12/2012 | Levert ..................... B64C 27/26 244/54 |
| 2019/0092484 | A1* | 3/2019 | Whiteford .............. B64D 27/26 |
| 2021/0094695 | A1* | 4/2021 | Hellegouarch ........ B64D 27/26 |

* cited by examiner

*Primary Examiner* — Christopher D Hutchens
*Assistant Examiner* — Steven J Shur
(74) *Attorney, Agent, or Firm* — Hovey Williams LLP (57) ABSTRACT

An assembly for reacting a thrust load from an engine, the assembly comprising a frame, a pin, an evener bar, and left and right thrust links. The frame includes an upper pin interface and a lower pin interface. The pin extends through the upper pin interface and the lower pin interface and includes an upper end and a lower end. The evener bar engages the lower end of the pin below the lower pin interface and connects the left and right thrust links to the pin. The pin is configured to react the thrust load at the lower pin interface and the upper pin interface thereby forming a distributed force couple between the lower pin interface and the upper pin interface.

20 Claims, 5 Drawing Sheets

THRUST LOAD REACTION ASSEMBLY

BACKGROUND

Turbofan engines with large by-pass ratios transfer thrust loads into supporting structures via intermediate connection assemblies between forward and aft connection assemblies. Intermediate connection assemblies introduce significant, undesirable localized bending moments at their connection points due to offset thrust lines of the thrust loads.

SUMMARY

Embodiments of the invention solve the above-mentioned problems and other problems and provide a distinct advancement in the art of aircraft engine pylons and engine attachment assemblies. More particularly, the invention provides intermediate connection assemblies that create a distributed force couple to reduce localized bending moments at their connection points.

An embodiment of the invention is a thrust load reaction assembly broadly comprising a frame, an outer pin, an inner pin, an upper thrust fitting, a lower thrust fitting, a lower pin retention component, an evener bar, an anti-rotation pin, and left and right thrust links.

The frame supports an engine on an aircraft wing or fuselage and may be a pylon including a torsion box structure. The frame includes an upper pin interface and a lower pin interface. The upper pin interface and the lower pin interface are openings aligned with each other on the top and bottom of the frame.

The outer pin includes an inner space for encircling the inner pin. The outer pin extends from the upper pin interface, through the lower pin interface, to the evener bar. The outer pin may be a primary intact load path for transmitting thrust loads the frame.

The inner pin is nested in the inner space of the outer pin. The inner pin extends from the upper pin interface, through the lower pin interface, to the evener bar. The inner pin may be a secondary "fail-safe" load path for transmitting thrust loads to the frame if the outer pin fails.

The upper thrust fitting may be or may include a bushing between the upper pin interface and the outer pin and inner pin. The upper thrust fitting further limits or further minimizes a bending moment at the upper pin interface via a spherical interface, a spherical bearing, an elastic-supported bushing, or the like.

The lower thrust fitting may be or may include a bushing between the lower pin interface and the outer pin and inner pin. The lower thrust fitting further limits or further minimizes a bending moment at the lower pin interface via a spherical interface, a spherical bearing, an elastic-supported bushing, or the like.

The lower pin retention component may be a nut, fastener, pin, or the like for retaining the outer pin and inner pin near the lower pin interface. For example, the lower pin retention component may secure the evener bar to the outer pin and the inner pin.

The evener bar includes a pin connection point, left and right thrust link connection points, and an anti-rotation arm. The evener bar connects the thrust links to the outer pin and the inner pin. The evener bar is configured to rotate slightly about an axis of the outer pin and inner pin at the pin connection point to equalize forces between the left and right thrust links.

The left and right thrust link connection points may include bearings for connecting the left and right thrust links to the evener bar. The anti-rotation arm is configured to engage the anti-rotation pin if one of the left and right thrust links or one of the left and right thrust link connection points fail, thus forming a fail-safe load path.

The anti-rotation pin extends from the lower thrust fitting or the frame and is configured to engage the anti-rotation arm of the evener bar if one of the left and right thrust links or one of the left and right thrust connection points fail, thus forming a fail-safe load path. The anti-rotation pin may also act as a secondary retention means for the evener bar.

The left thrust link connects the engine to the frame via the left thrust link connection point of the evener bar and via the outer pin and inner pin. The left thrust link may be pivotably connected at the left thrust link connection point via a pin or other fastener.

The right thrust link connects the engine to the frame via the right thrust link connection point of the evener bar and via the outer pin and inner pin. The right thrust link may be pivotably connected at the right thrust link connection point via a pin or other fastener.

The thrust load reaction assembly reacts a thrust load into distributed local shearing forces at the upper pin interface and lower pin interface. This reduces local induced bending moments. Specifically, the spaced apart upper pin interface and lower pin interface create a mechanical advantage via a distributed force couple to counteract or reduce the bending moment at the lower pin interface. Bending load effects may be further reduced via spherical bearings or elastically suspended bushings that allow the outer pin and inner pin to flex or move slightly.

A thrust load reaction assembly constructed in accordance with another embodiment broadly comprises a frame, a pin, an upper thrust fitting, a lower thrust fitting, an evener bar, an evener bar retention bracket, and left and right thrust links.

The frame supports an engine on an aircraft wing or fuselage and may be a pylon including a torsion box structure. The frame includes an upper pin interface and a lower pin interface. The upper pin interface and the lower pin interface are openings aligned with each other on the top and bottom of the frame.

The pin extends from the upper pin interface, through the lower pin interface, to the evener bar. The pin may include a shim for limiting displacement of the evener bar or for providing a clamping force thereto.

The upper thrust fitting may be or may include a bushing between the upper pin interface and the pin. The upper thrust fitting further limits or further minimizes a bending moment at the upper pin interface via a spherical interface, a spherical bearing, an elastic-supported bushing, or the like.

The lower thrust fitting may be or may include a bushing between the lower pin interface and the pin. The lower thrust fitting further limits or further minimizes a bending moment at the lower pin interface via a spherical interface, a spherical bearing, an elastic-supported bushing, or the like.

The evener bar includes a pin connection point, left and right thrust link connection points, and fail-safe geometry. The evener bar may be configured to rotate slightly about the pin at the pin connection point to equalize forces between the left and right thrust links. The evener bar may include bearings for connecting the thrust links to the evener bar at the left and right thrust link connection points and for connecting the evener bar to the pin at the pin connection point. The fail-safe geometry is configured to engage the lower thrust fitting if one of the left and right thrust links, one of the left and right thrust link connection points, or the pin connection point fails, thus forming a fail-safe load path.

The evener bar retention bracket is attached to the lower thrust fitting and secures the evener bar on the pin. The evener bar retention bracket may include key geometry configured to engage the key geometry of the pin to prevent axial rotation of the pin.

The left thrust link connects the engine to the frame via the left thrust link connection point of the evener bar and the pin. The left thrust link may be pivotably connected at the left thrust link connection point via a pin or other fastener.

The right thrust link connects the engine to the frame via the right thrust link connection point of the evener bar and the pin. The right thrust link may be pivotably connected at the right thrust link connection point via a pin or other fastener.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Figure 1:
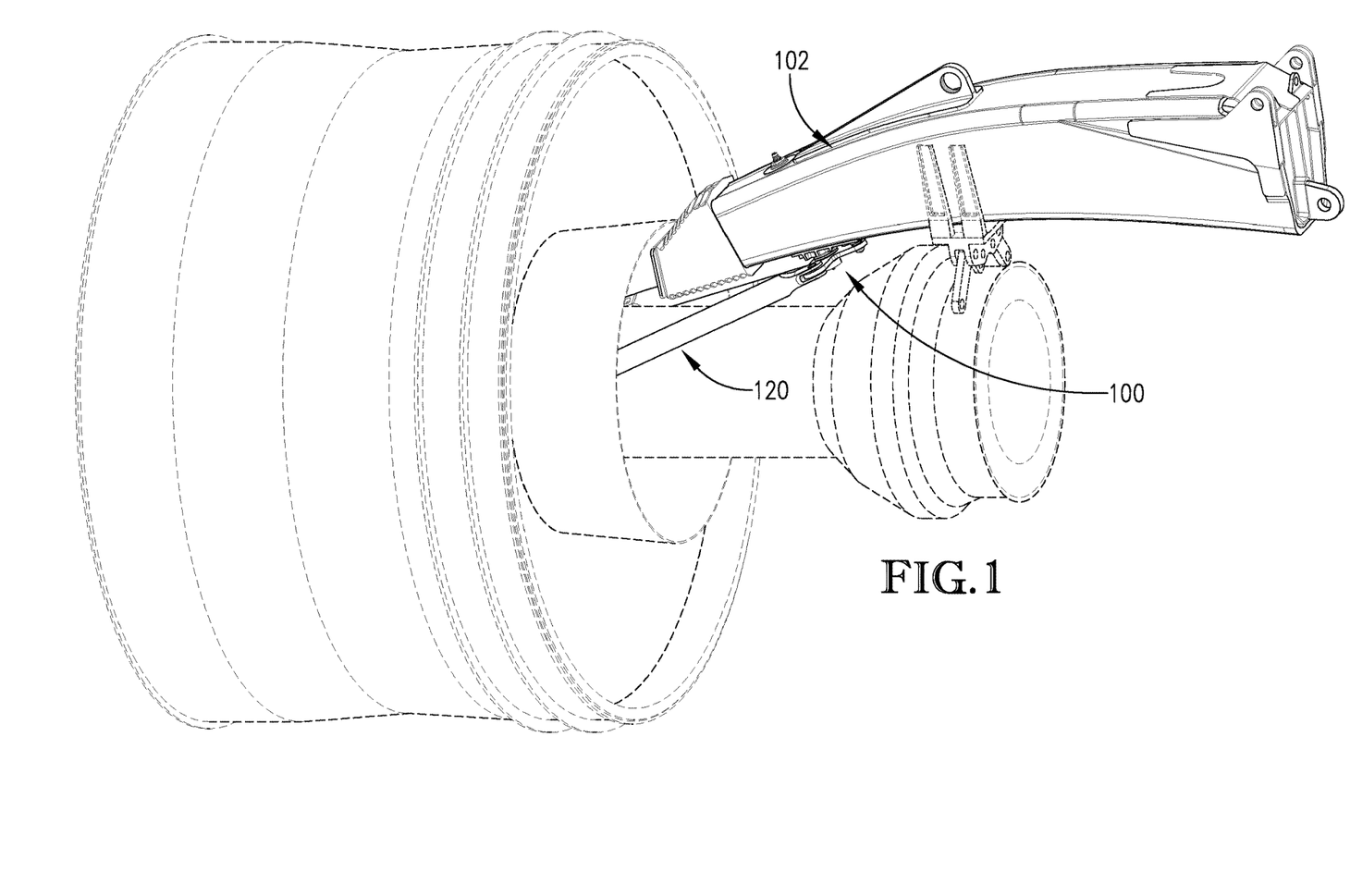
FIG. 1 is a side elevation view of a thrust load reaction assembly constructed in accordance with an embodiment of the invention.
Figure 2:
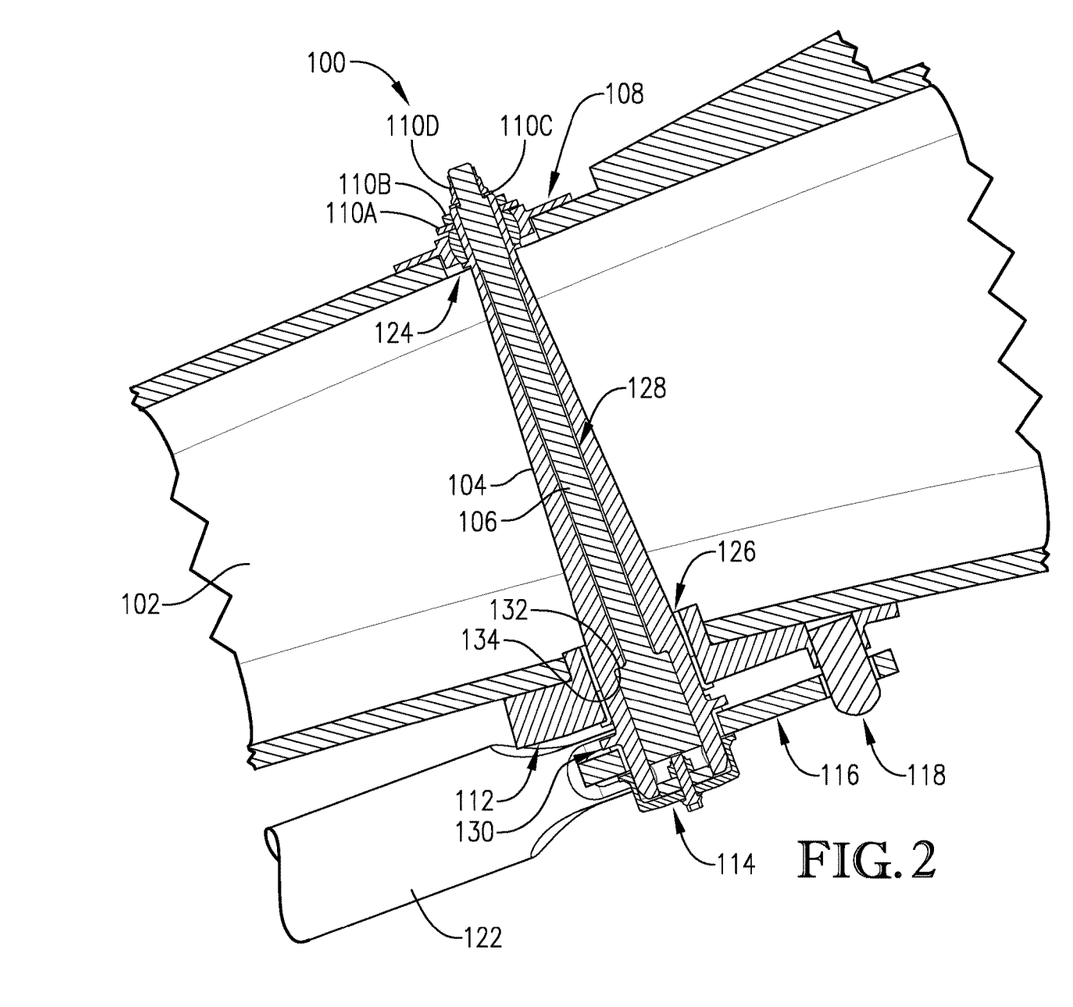
FIG. 2 is a partial cutaway side elevation view of the thrust load reaction assembly of FIG. 1.
Figure 3:
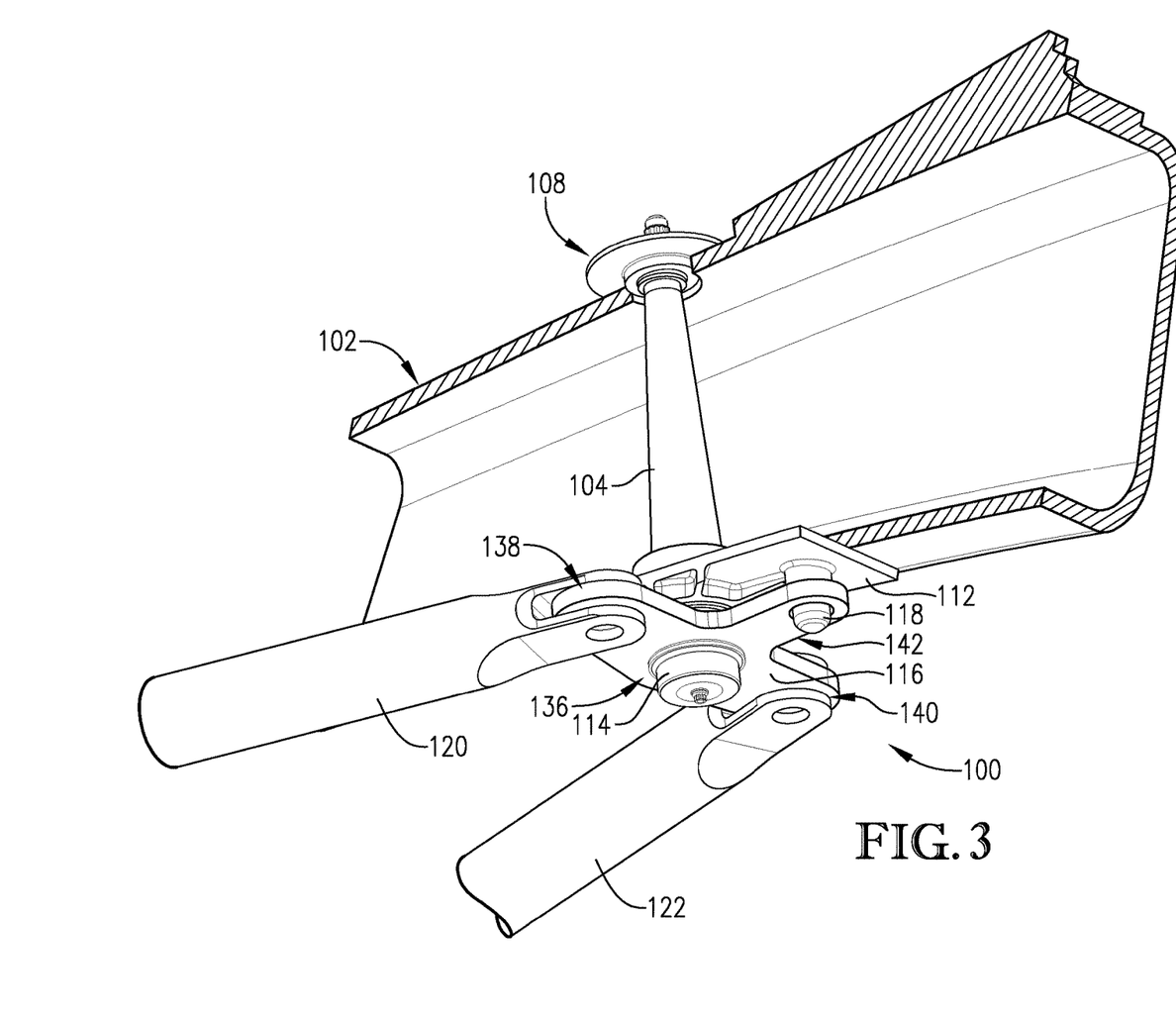
FIG. 3 is a partial bottom perspective view of the thrust load reaction assembly of FIG. 1.

Turning to FIGS. 1-3, a thrust load reaction assembly 100 constructed in accordance with an embodiment of the invention is illustrated. The thrust load reaction assembly 100 broadly comprises a frame 102, an outer pin 104, an inner pin 106, an upper thrust fitting 108, a plurality of upper pin retention components 110A-D, a lower thrust fitting 112, a lower pin retention component 114, an evener bar 116, an anti-rotation pin 118, and left and right thrust links 120, 122.

The frame 102 supports an engine on an aircraft wing or fuselage and may be a pylon including a torsion box structure. The frame 102 includes an upper pin interface 124 and a lower pin interface 126. The frame 102 may be metallic, composite, or of hybrid composition. The frame 102 may be monolithic or an assemblage of subcomponents.

The upper pin interface 124 may be an opening or receiving geometry on an upper side of the frame 102. The upper pin interface 124 may be internal, coincidental, or external to the frame 102.

The lower pin interface 126 may be an opening or receiving geometry on a lower side of the frame 102 opposite the upper pin interface 124. The lower pin interface 126 may be internal, coincidental, or external to the frame 102. In one embodiment, the upper pin interface 124 and the lower pin interface 126 are co-aligned.

The outer pin 104 extends vertically and includes an inner space 128 for encircling the inner pin 106. The outer pin 104 extends from the upper pin interface 124, through the lower pin interface 126, to the evener bar 116. The outer pin 104 may have a reduced cross-section shape that tapers towards its upper end. The outer pin 104 may include evener bar engagement geometry 130 (e.g., a shoulder or flange) for limiting displacement of the evener bar 116. The outer pin 104 may also include inner pin engagement geometry 132 for limiting axial displacement of the outer pin 104 relative to the inner pin 106 if the outer pin 104 fails. The outer pin 104 may be a primary intact load path for transmitting thrust loads the frame 102.

The inner pin 106 extends vertically and is nested in the inner space 128 of the outer pin 104. The inner pin 106 extends from the upper pin interface 124, through the lower pin interface 126, to the evener bar 116. The inner pin 106 may include outer pin engagement geometry 134 for limiting axial displacement of the outer pin 104 relative to the inner pin 106 if the outer pin 104 fails. The inner pin 106 may also include an inner space and geometry for enabling retention of the evener bar 116. The inner pin 106 may be a secondary "fail-safe" load path for transmitting thrust loads to the frame 102 if the outer pin 104 fails.

The upper thrust fitting 108 may be or may include a bushing between the upper pin interface 124 and the outer pin 104 and inner pin 106. The upper thrust fitting 108 may be cylindrical or may include conical geometry for receiving the outer pin 104. The upper thrust fitting 108 may be separate from or monolithic with the frame 102 and may be a replaceable wear component. The upper thrust fitting 108 may further limit or minimize a bending moment at the upper pin interface 124 via a spherical interface, a spherical bearing, an elastic-supported bushing, or the like.

The upper pin retention components 110A-D may include washers, nuts, fasteners, pins, or the like for retaining the outer pin 104 and inner pin 106 near the upper pin interface 124. For example, the washer 110A and nut 110B may secure the outer pin 104 to the upper thrust fitting 108. Similarly, the washer 110C and nut 110D may secure the inner pin 106 in the outer pin 104.

The lower thrust fitting 112 may be or may include a bushing between the lower pin interface 126 and the outer pin 104 and inner pin 106. The lower thrust fitting 112 may be cylindrical or may include conical geometry for receiving the outer pin 104. The lower thrust fitting 112 may be separate from or monolithic with the frame 102 and may be a replaceable wear component. The lower thrust fitting 112 may further limit or minimize a bending moment at the lower pin interface 126 via a spherical interface, a spherical bearing, an elastic-supported bushing, or the like.

The lower pin retention component 114 may be a nut, fastener, pin, or the like for retaining the outer pin 104 and inner pin 106 near the lower pin interface 126. For example, the lower pin retention component 114 may secure the outer pin 104 and the inner pin 106 to the evener bar 116. The lower pin retention component 114 may be a threaded nut, a washer, a plate, a housing, or the like. The lower pin retention component 114 may include a shoulder engaging or fastened to the lower end of the outer pin 104 or inner pin 106. The lower pin retention component 114 may fasten to a feature on the opposing side of the evener bar 116 and may apply a clamping force on the evener bar 116. Filler shims between the lower pin retention component 114 and the evener bar 116 may facilitate the clamping force. The clamping force may reduce vibration wear effects.

The evener bar 116 may include a pin connection point 136, left and right thrust link connection points 138, 140, and an anti-rotation arm 142. The evener bar 116 connects the thrust links 120, 122 to the outer pin 104 and the inner pin 106. The evener bar 116 is configured to rotate slightly about the outer pin 104 and inner pin 106 at the pin connection point 136 to equalize forces between the left and right thrust links 120, 122. To that end, the pin connection point 136 may include a bearing for pivotably connecting the evener bar 116 to the outer pin 104 and inner pin 106.

The left and right thrust link connection points 138, 140 may include bearings for connecting the left and right thrust links 120, 122 to the evener bar 116. The anti-rotation arm 142 is configured to engage the anti-rotation pin 118 if one of the left and right thrust links 120, 122 or one of the left and right thrust link connection points 138, 140 fail, thus forming a fail-safe load path.

The anti-rotation pin 118 extends from the lower thrust fitting 112 or the frame 102 and may be a semi-permanent installed feature or a removable feature such as a bolt. The anti-rotation pin 118 is configured to engage the anti-rotation arm 142 of the evener bar 116 if one of the left and right thrust links 120, 122 or one of the left and right thrust connection points 138, 140 fail, thus forming a fail-safe load path. The anti-rotation pin 118 may also act as a secondary retention means for the evener bar 116.

The left thrust link 120 connects the engine to the frame 102 via the left thrust link connection point 138 of the evener bar 116 and the outer pin 104 and inner pin 106. The left thrust link 120 may be pivotably connected at the left thrust link connection point 138 via a pin or other fastener.

The right thrust link 122 connects the engine to the frame 102 via the right thrust link connection point 140 of the evener bar 116 and the outer pin 104 and inner pin 106. The right thrust link 122 may be pivotably connected at the right thrust link connection point 140 via a pin or other fastener.

The thrust load reaction assembly 100 creates an applied load-path line-of-action located external to and below the frame 102. Other applied load paths above or internal to the frame 102 (between the upper pin interface 124 and lower pin interface 126 may also be used. The thrust load along the applied load-path line-of-action is converted into distributed local shearing forces reacted by the upper pin interface 124 and lower pin interface 126. The outer pin 104 and inner pin 106 may be perpendicular to the applied load line-of-action to minimize axial loads on the outer pin 104 and inner pin 106. Alternatively, axial loads may be mitigated via additional robustness in the lower pin retention component 114.

Installation of the thrust load reaction assembly may include integrating the outer pin 104 and inner pin 106 with the frame 102 and integrating the evener bar 116 with the left and right thrust links 120, 122. Alternatively, the upper thrust fitting 108 and lower thrust fitting 112 may be integrated with the frame 102 and the outer pin 104, inner pin 106, and evener bar 116 being integrated with the left and right thrust links 120, 122.

Forward and aft engine supports (not shown) may allow the evener bar 116 to be installed prior to the forward and aft engine supports engaging sufficiently to limit fore-aft movement that may be needed to fully seat the evener bar 116. Once the evener bar 116 is secured, full engagement of the forward and aft engine supports may occur. As such, installation may include hoisting the engine into proximity of the lower thrust fitting 112, engaging and retaining the evener bar 116 to the outer pin 104 and inner pin 106, and engaging guide/shear pins in forward and aft engine supports.

In another embodiment, the outer pin 104 and inner pin 106 may be integrated with the evener bar 116 and left and right thrust links 120, 122 and then engaged with the upper thrust fitting 108 and lower thrust fitting 112 during engine installation. This may provide an advantage during engine installation since a length of the outer pin 104 and inner pin 106 provide a mechanical advantage in guiding the outer pin 104 and inner pin 106 into their final engagement. This overcomes potential binding of the evener bar 116 with the outer pin 104 and inner pin 106. Internal access to the frame 102 and/or a guidance means such as a tapering cone or funnel surface facing the outer pin 104 and inner pin 106 may facilitate installation of the outer pin 104 and inner pin 106 in the upper thrust fitting 108. Alternatively, tapered features of the outer pin 104 may act as a guide to align the outer pin 104 and upper thrust fitting 108.

Engine installation may require positioning means that enable displacement of the engine in X, Y, Z, Mx, My, and Mz directions. This allows thrust load reaction components of the thrust load reaction assembly 100 to be engaged while enabling simultaneous or sequential engagement of at least one of the forward and aft supports.

The thrust load reaction assembly 100 provides several advantages. For example, the thrust load reaction assembly 100 minimizes a local induced bending moment due to thrust loads that are offset from the nearest reaction location. Specifically, the spaced apart upper pin interface 124 and lower pin interface 126 create a mechanical advantage via a distributed force couple to counteract or reduce the bending moment at the lower pin interface. Bending load effects may be further reduced via spherical bearings or elastically suspended bushings that allow the outer pin 104 and inner pin 106 to flex or move slightly.

The outer pin 104 provides a primary load path, and the inner pin 106 provides a secondary, fail-safe load path. Similarly, the anti-rotation arm 142 of the evener bar 116 provides a fail-safe load path. The evener bar 116 also equalizes forces between the left thrust link 120 and the right thrust link 122.

Figure 4:
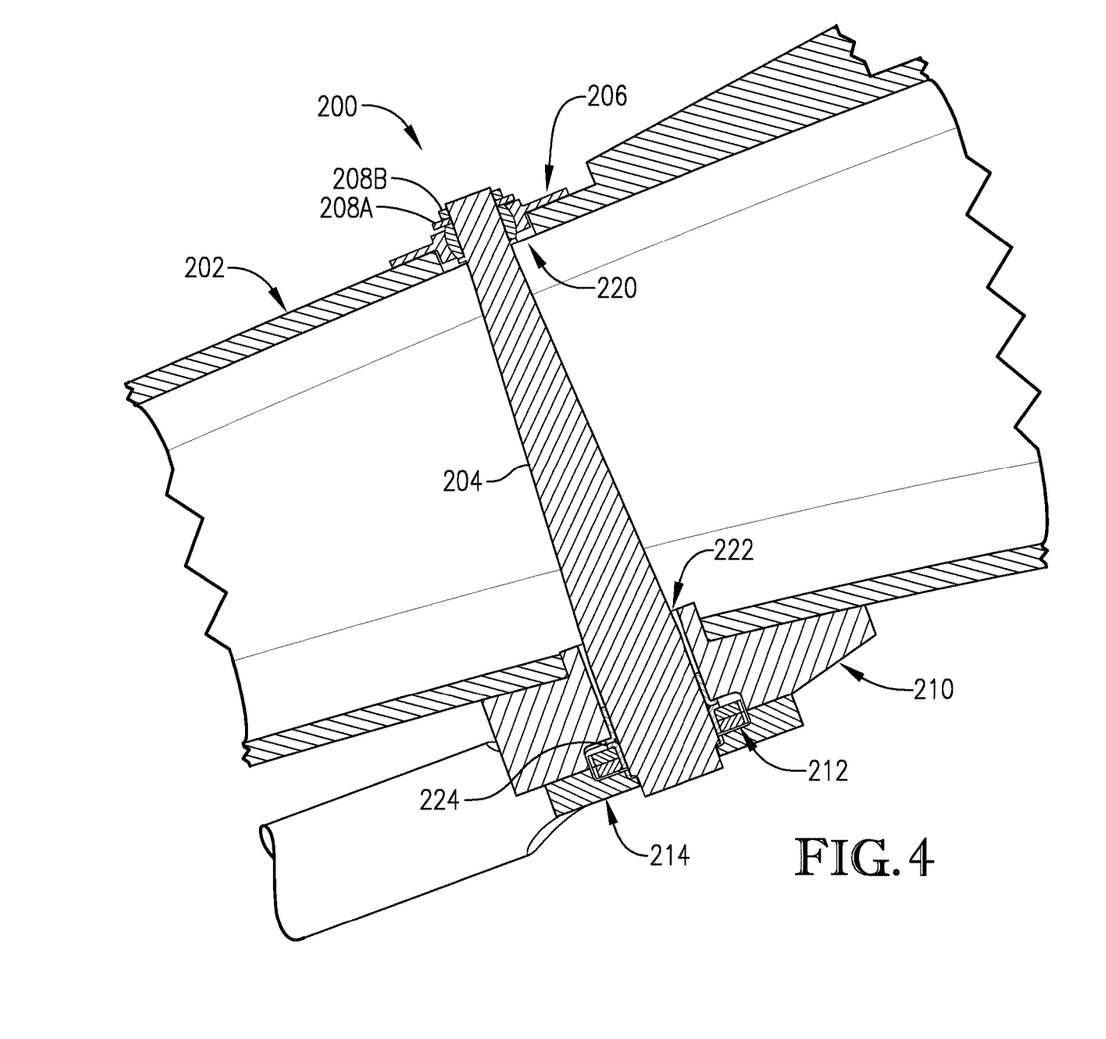
FIG. 4 is a partial cutaway side elevation view of a thrust load reaction assembly constructed in accordance with another embodiment of the invention.
Figure 5:
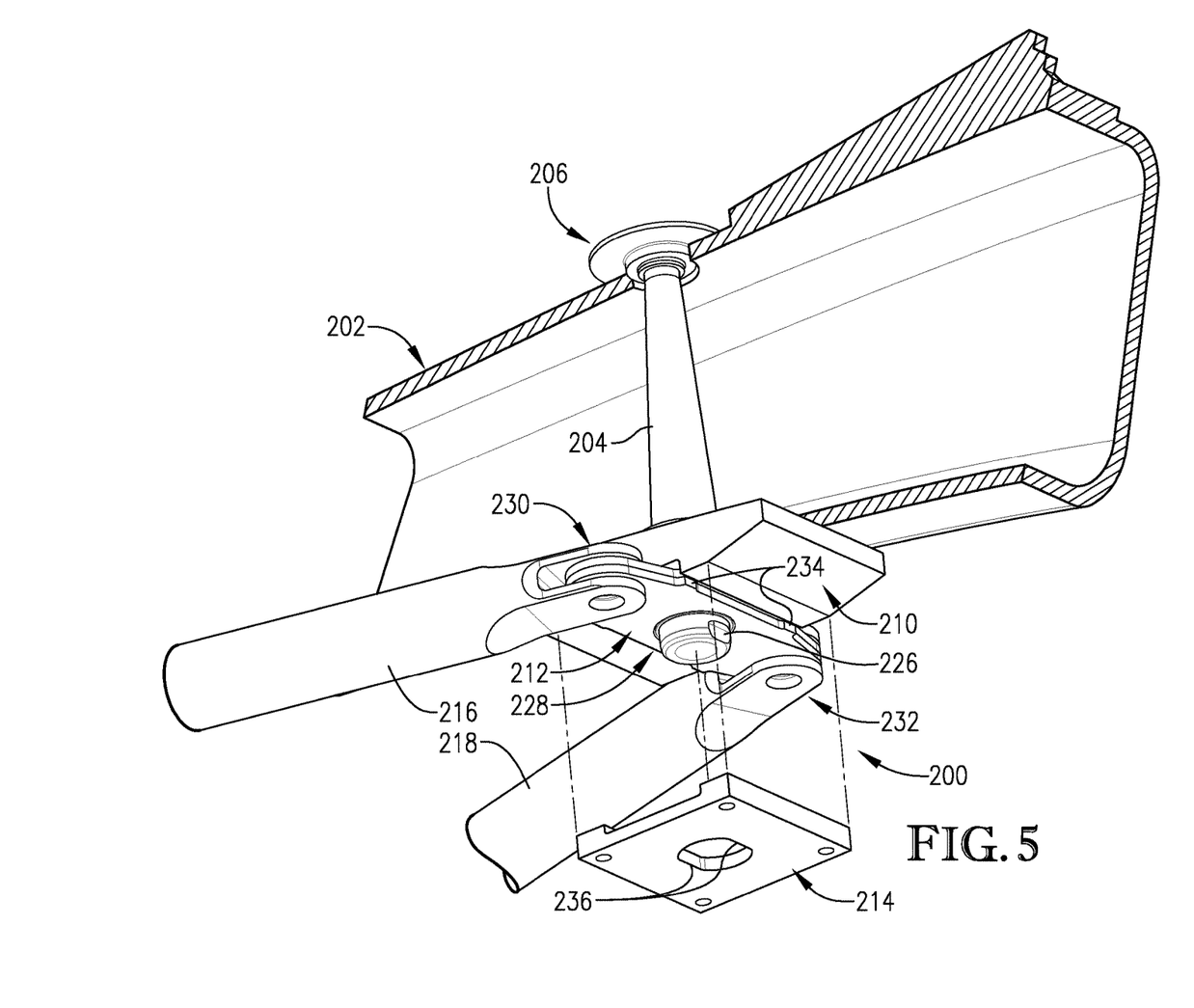
FIG. 5 is a partial cutaway bottom perspective view of the thrust load reaction assembly of FIG. 4.

Turning to FIGS. 4 and 5, a thrust load reaction assembly 200 constructed in accordance with another embodiment of the invention is illustrated. The thrust load reaction assembly 200 broadly comprises a frame 202, a pin 204, an upper thrust fitting 206, a plurality of upper pin retention components 208A,B, a lower thrust fitting 210, an evener bar 212, an evener bar retention bracket 214, and left and right thrust links 216, 218.

The frame 202 supports an engine on an aircraft wing or fuselage and may be a pylon including a torsion box structure. The frame 202 includes an upper pin interface 220 and a lower pin interface 222. The frame 202 may be metallic, composite, or of hybrid composition. The frame 202 may be monolithic or an assemblage of subcomponents.

The pin 204 may be a vertically extending rod or beam extending from the upper pin interface 220, through the lower pin interface 222, to the evener bar 212. The pin 204 may have a reduced cross-section shape that tapers towards its upper end. The pin 204 may include a shim 224 for limiting displacement of the evener bar 212 or for providing a clamping force thereto and key geometry 226 configured to engage complementary key geometry of the evener bar retention bracket 214 for preventing axial rotation of the pin 204.

The upper thrust fitting 206 may be or may include a bushing between the upper pin interface 220 and the pin 204. The upper thrust fitting 206 may be cylindrical or may include conical geometry for receiving the pin 204. The upper thrust fitting 206 may be separate from or monolithic with the frame 202 and may be a replaceable wear component. The upper thrust fitting 206 may limit or minimize a bending moment at the upper pin interface 220 via a spherical interface, a spherical bearing, an elastic-supported bushing, or the like.

The upper pin retention components 208A,B may include washers, nuts, fasteners, pins, or the like for retaining the pin 204 near the upper pin interface 220. For example, the washer 208A and nut 208B may secure the pin 204 to the upper thrust fitting 206.

The lower thrust fitting 210 may be or may include a bushing between the lower pin interface 222 and the pin 204. The lower thrust fitting 210 may be cylindrical or may include conical geometry for receiving the pin 204. The lower thrust fitting 210 may be separate from or monolithic with the frame 202 and may be a replaceable wear component. The lower thrust fitting 210 may limit or minimize a bending moment at the lower pin interface 222 via a spherical interface, a spherical bearing, an elastic-supported bushing, or the like.

The evener bar 212 may include a pin connection point 228, left and right thrust link connection points 230, 232, and fail-safe geometry 234. The evener bar 212 may be configured to rotate slightly about the pin 204 at the pin connection point 228 to equalize forces between the left and right thrust links 216, 218. The evener bar 212 may include bearings for connecting the thrust links 216, 218 to the evener bar 212 at the left and right thrust link connection points 230, 232 and for connecting the evener bar 212 to the pin 204 at the pin connection point 228. The fail-safe geometry 234 is configured to engage the lower thrust fitting 210 if one of the left and right thrust links 216, 218, one of the left and right thrust link connection points 230, 232, or the pin connection point 228 fails, thus forming a fail-safe load path.

The evener bar retention bracket 214 is attached to the lower thrust fitting 210 and secures the evener bar 212 on the pin 204. The evener bar retention bracket 214 may include key geometry 236 configured to engage the key geometry 236 of the pin 204 to prevent axial rotation of the pin 204.

The left thrust link 216 connects the engine to the frame 202 via the left thrust link connection point 230 of the evener bar 212 and the pin 204. The left thrust link 216 may be pivotably connected at the left thrust link connection point 230 via a pin or other fastener.

The right thrust link 218 connects the engine to the frame 202 via the right thrust link connection point 232 of the evener bar 212 and the pin 204. The right thrust link 218 may be pivotably connected at the right thrust link connection point 232 via a pin or other fastener.

The thrust load reaction assembly 200 creates an applied load-path line-of-action located external to and below the frame 202. Other applied load paths above or internal to the frame 202 (between the upper pin interface 220 and lower pin interface 222 may also be used. The thrust load along the applied load-path line-of-action is converted into distributed local shearing forces reacted by the upper pin interface 220 and lower pin interface 222. The pin 204 may be perpendicular to the applied load line-of-action to minimize axial loads on the pin 204. Alternatively, axial loads may be mitigated via additional robustness in the evener bar retention bracket 214.

The thrust load reaction assembly 200 provides several advantages. For example, the thrust load reaction assembly 200 minimizes a local induced bending moment due to thrust loads that are offset from the nearest reaction location. Specifically, the spaced apart upper pin interface 220 and lower pin interface 222 create a mechanical advantage via a distributed force couple to counteract or reduce the bending moment at the lower pin interface. Bending load effects may be further reduced via spherical bearings or elastically suspended bushings that allow the pin 204 to flex or move slightly.

The fail-safe geometry 234 of the evener bar 212 provides a fail-safe load path. The evener bar 212 also equalizes forces between the left thrust link 216 and the right thrust link 218. The key geometry 226 of the pin 204 and the key geometry 236 of the evener bar retention bracket 214 also prevent rotation of the pin 204.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An assembly for reacting a thrust load from an engine, the assembly comprising:
   a pylon including a first wall having an upper pin interface and a second wall opposite the first wall, the second wall having a lower pin interface;
   a pin extending through the upper pin interface and the lower pin interface, the pin including an upper end and a lower end;

an evener bar engaging the lower end of the pin below the lower pin interface;
a left thrust link attached to the evener bar; and
a right thrust link attached to the evener bar opposite the left thrust link, the pin forming a distributed force couple between the lower pin interface and the upper pin interface.

2. The assembly of claim 1, the pin being an outer pin, the assembly further comprising an inner pin encircled by the outer pin, extending through the upper pin interface and the lower pin interface, and being attached to the evener bar below the lower pin interface so that the outer pin and the inner pin form a fail-safe load path.

3. The assembly of claim 1, further comprising a thrust fitting positioned near the lower pin interface for reacting the thrust load from the pin to the pylon at the lower pin interface.

4. The assembly of claim 3, the thrust fitting including at least one of a bearing and a bushing to limit a local bending moment applied to the pylon at the lower pin interface.

5. The assembly of claim 1, the evener bar including an anti-rotation arm, the assembly further comprising an anti-rotation pin engaging the anti-rotation arm.

6. The assembly of claim 1, further comprising a thrust fitting positioned near the upper pin interface for reacting the thrust load from the pin to the pylon at the upper pin interface.

7. The assembly of claim 6, the thrust fitting including at least one of a bearing and a bushing to limit a local bending moment applied to the pylon at the upper pin interface.

8. The assembly of claim 1, wherein the pin extends perpendicular to the thrust load.

9. The assembly of claim 1, further comprising an evener bar retention component configured to retain the evener bar in engagement with the lower end of the pin.

10. The assembly of claim 1, the pin tapering in diameter from its lower end to its upper end.

11. An assembly for reacting a thrust load of an engine, the assembly comprising:
a pylon including a first wall having an upper pin interface and a second wall opposite the first wall, the second wall having a lower pin interface;
a pin extending through the upper pin interface and the lower pin interface, the pin including an upper end and a lower end;
an evener bar engaging the lower end of the pin below the lower pin interface;
an evener bar retention bracket configured to secure the evener bar in engagement with the lower end of the pin;
a left thrust link attached to the evener bar; and
a right thrust link attached to the evener bar opposite the left thrust link, the pin forming a distributed force couple between the lower pin interface and the upper pin interface.

12. The assembly of claim 11, the lower end of the pin and the evener bar retention bracket including complementary key geometry for minimizing rotation of the pin.

13. The assembly of claim 11, the evener bar including fail-safe geometry configured to create an alternate load path.

14. The assembly of claim 11, further comprising a thrust fitting positioned near the lower pin interface for reacting the thrust load from the pin to the pylon at the lower pin interface.

15. The assembly of claim 14, the thrust fitting including at least one of a bearing and a bushing to limit a local bending moment applied to the pylon at the lower pin interface.

16. The assembly of claim 11, further comprising a thrust fitting positioned near the upper pin interface for reacting the thrust load from the pin to the pylon at the upper pin interface.

17. The assembly of claim 16, the thrust fitting including at least one of a bearing and a bushing to limit a local bending moment applied to the pylon at the upper pin interface.

18. The assembly of claim 11, wherein the pin extends perpendicular to the thrust load.

19. The assembly of claim 11, the pin tapering in diameter from its lower end to its upper end.

20. An assembly for reacting a thrust load of an engine, the assembly comprising:
a pylon including a first wall having an upper pin interface and a second wall opposite the first wall, the second wall having a lower pin interface;
a pin extending through the upper pin interface and the lower pin interface, the pin including an upper end and a lower end and key geometry near the lower end, the pin being tapered from the lower end to the upper end;
an evener bar engaging the lower end of the pin below the lower pin interface;
an evener bar retention bracket configured to secure the evener bar in engagement with the lower end of the pin, the evener bar retention bracket including key geometry configured to engage key geometry of the pin to prevent axial rotation of the pin;
a left thrust link attached to the evener bar; and
a right thrust link attached to the evener bar opposite the left thrust link,
the pin being configured to react the thrust load at the lower pin interface and the upper pin interface thereby forming a distributed force couple between the lower pin interface and the upper pin interface, the pin being perpendicular to the thrust load.

* * * * *